United States Patent [11] 3,622,435

| [72] | Inventor | Arthur F. Cacella<br>16 Hillwood Road, East Brunswick, N.J. 08816 |
|---|---|---|
| [21] | Appl. No. | 680,504 |
| [22] | Filed | Nov. 3, 1967 |
| [45] | Patented | Nov. 23, 1971 |

[54] INTERBONDED COMPRESSED POLYURETHANE FOAM MATERIAL AND METHOD OF MAKING SAME
9 Claims, 4 Drawing Figs.

[52] U.S. Cl. .................................................. 161/157,
161/190, 161/159, 161/170
[51] Int. Cl. .................................................. B32b 5/18
[50] Field of Search ........................................... 161/190,
156, 157, 159, 168, 169, 170, DIG. 2; 260/2.5 A, 2.5 AN; 117/63

[56] References Cited
UNITED STATES PATENTS

| 2,439,514 | 4/1948 | Herndon .................... | 161/190 |
| 2,766,164 | 10/1956 | Salem ........................ | 161/190 |
| 2,972,554 | 2/1961 | Muskat et al. ............... | 117/76 |
| 3,025,200 | 3/1962 | Powers ....................... | 161/168 |
| 3,062,757 | 11/1962 | Dombrow et al. ........... | 260/2.5 AN |
| 3,317,367 | 5/1967 | Koller ........................ | 161/157 |
| 3,325,338 | 6/1967 | Geen .......................... | 161/168 |
| 2,625,532 | 1/1953 | Seeger ........................ | 161/DIG. 2 |

*Primary Examiner*—Morris Sussman
*Attorney*—Ryder & Hefter

ABSTRACT: A permeable polyurethane sheet structure is formed by impregnating a skeletal polyurethane foam, such as a reticulated open cell foam, with a cross-linking agent, such as a polyisocyanate, having defined characteristics and compressing said foam with heat and pressure.

PATENTED NOV 23 1971  3,622,435
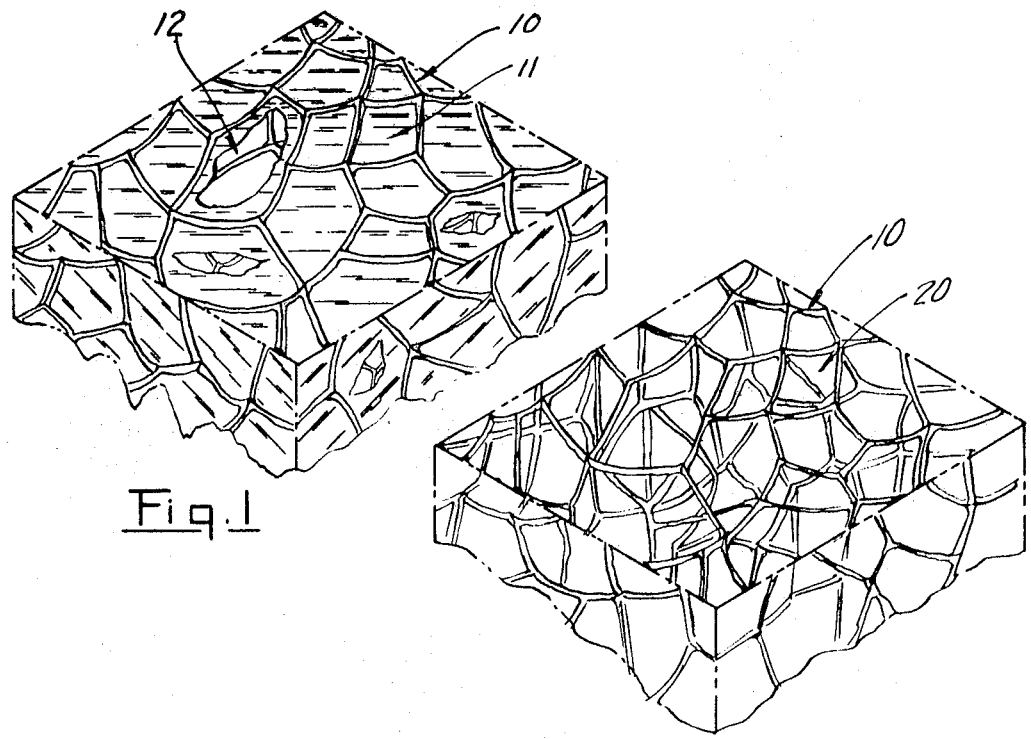
Fig. 1
Fig. 2
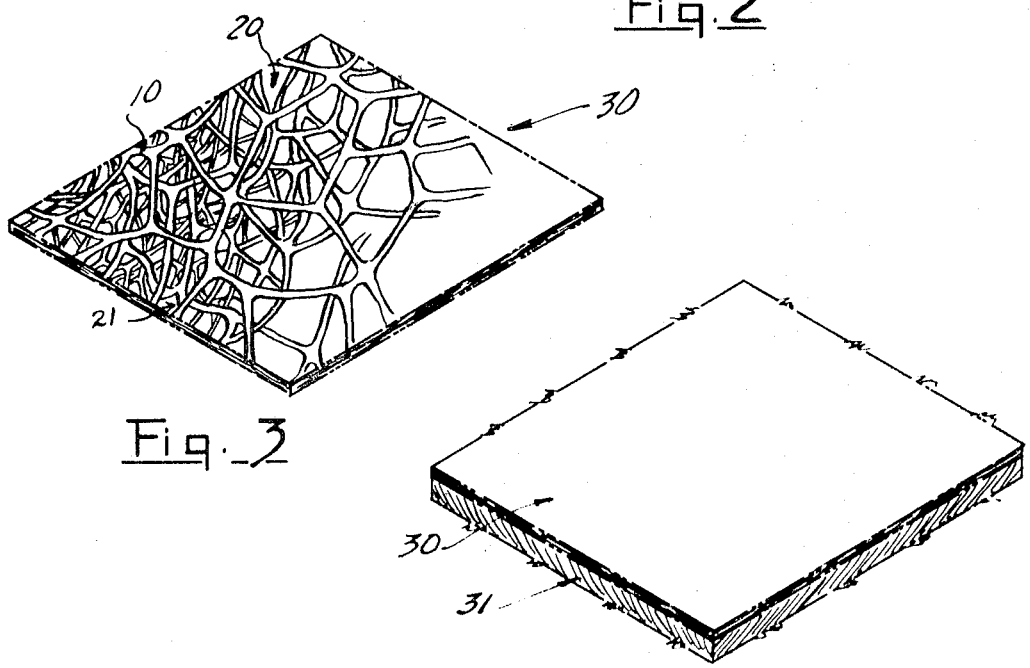
Fig. 3
Fig. 4
INVENTOR.
ARTHUR R. CACELLA
BY
Davis, Hoxie, Faithfull & Hapgood
ATTORNEYS

INTERBONDED COMPRESSED POLYURETHANE FOAM MATERIAL AND METHOD OF MAKING SAME

FIELD OF THE INVENTION

This invention relates to a permeable polyurethane sheet structure and a method for producing it.

PRIOR ART

Polyurethane open cell foams are well known. The most common method of producing such a foam is the so-called "one-shot" method in which a hydroxyl-terminated polyether or polyester, having a molecular weight of 500 to 5,000, is reacted with water and an excess of a polyisocyanate in the presence of a catalyst and various additives. Such foams may be reticulated by any of a number of procedures, whereby the cell walls of the foam are ruptured, dissolved or melted while the network of interconnected polyurethane strands remains substantially intact. After reticulation a three-dimensional skeletal structure remains which is composed of the strands defining the cell edges.

An open cell polyurethane reticulated foam is described in U.S. Pat. No. 3,025,200; and a number of reticulation procedures are referred to in U.S. Pat. No. 3,325,338.

In the process of the latter patent, a heat reticulated open cell polyurethane foam is compacted with heat and pressure. However, we have found that the product of that process does not have sufficient physical and chemical stability to render it commercially useful as a leather replacement material, one important end use for such a product.

SUMMARY OF INVENTION

In carrying out my invention a permeable polyurethane sheet structure is formed by impregnating a thin sheet of a skeletal polyurethane foam, such as a reticulated open cell polyurethane foam, with a cross-linking agent, such as a polyisocyanate, of the nature hereinafter described and compressing said foam with pressure and heat. In an embodiment of the invention, a permeable polyurethane sheet structure, particularly useful as a leather replacement material, is formed by (1) taking a thin sheet of a nonwoven substrate material containing active hydrogen atoms, (2) taking a thin sheet of an open cell polyurethane foam having a continuous network of strands and cell walls, removing at least most of said cell walls by reticulation of said foam, (3) applying between said substrate and said foam such a polyisocyanate; and (4) consolidating said sheets by the use of heat and pressure.

DRAWINGS

In the drawings,

FIG. 1 is an enlarged representation of an open cell, polyurethane foam.

FIG. 2 is an enlarged representation of a reticulated, open cell, polyurethane foam.

FIG. 3 is an enlarged representation of a section of the type of compressed, interbonded porous sheet material which results from the use of this invention; and FIG. 4 shows that product adhered to a substrate, such as, for example, a nonwoven material made of staple fibers containing active hydrogen atoms.

DETAILED DESCRIPTION INCLUDING PREFERRED EMBODIMENTS

In carrying out my invention, a product is obtained which is vapor permeable, strong, flexible and has a high resistance to heat, solvents and delamination (when bonded to a substrate) according to the tests hereinafter described. The method is also simple and economic. Another advantage of the invention is that the permeability of the resulting product may be varied over a wide range, largely depending upon the characteristics of the starting foam material. The compressed chemically bonded, permeable sheet made according to the invention may be used in any application, for example, as a diaphragm, where a permeable, tough and heat and chemically resistant sheet is required. Such a sheet may also be bonded to a fabric, in the manner hereinafter described. In using my invention a particularly leather replacement material may be produced when such a compressed foam sheet is bonded to a nonwoven fabric, as hereinafter described. This specification is largely directed to such a composite material, but it will be understood that the invention is not limited to such a material.

To produce such a composite material according to a preferred embodiment of the invention, a polyisocyanate, having certain characteristics described below, is applied to a thin sheet of a needled batt of a nonwoven substrate material made from staple fibers, at least about 5 percent of said fibers containing active hydrogen atoms. A thin sheet of a reticulated open cell polyurethane foam is then placed on the side of the substrate to which the isocyanate has been applied. The isocyanate penetrates the foam, and the combined sheets are consolidated with heat and pressure, preferably on the order of about 150° C. to about 165° C. (for 30 minutes) and 15 to 50 p.s.i., respectively.

The polyisocyanate in penetrating the foam not only bonds the polyurethane strands at their crossover points but also bonds such strands to fibers of the substrate material where the foam and substrate meet. In the case of the use of a polyisocyanate to bond the polyurethane strands at their crossover points, it is thought that the bonds are chemical. It is also thought that the bonds are chemical where a polyisocyanate bonds such strands to fibers of the substrate material containing active hydrogen atoms.

Suitable cross-linking agents, useful in accordance with my invention, in general comprise flexible long-chain molecules which permit forming strong flexible bridges between various portions of the product structure, including adjoining strands within the foam or substrate or between them. Chemical bonding with cross-linking agents occurs through the chemical reaction with the product structure of at least 2 organo-functional groups (which may be the same or different) in the same cross-linking molecule, preferably one at each end of the molecule. In addition to polyisocyanates which have been found to be useful as cross-linking agents in accordance with this invention, while compounds within the following classes have not been tested specifically, I believe that suitable cross-linking agents may be selected from those classes, as follows: N-methylol compounds, halohydrins, aldehyde derivatives, epoxides, and reactive silanes.

The cross-linking agent when reacted in the consolidated material must not only give a flexible bond but must have such characteristics and be applied at such a level so as not form a continuous film nor fill all the pores in the foam or substrate. When applied it must have enough liquidity so that it penetrates the foam without forming a film. A liquid cross-linking agent, such as a polyisocyanate, is therefore preferred, although it will be apparent that one otherwise viscous or solid, but in a solvent, may be used. Hexamethylene diisocyanate and tolylene diisocyanate have been found to be unsatisfactory in using my invention. A long-chain aliphatic diisocyanate having a molecular weight of about 400 to 3,000 is preferred. A diisocyanate designated DDI-1410 and sold by General Mills Co. has been found to be particularly useful. It is based on a dimer of a fatty acid and has 36 carbon atoms in the chain. Particularly useful in carrying out my invention are prepolymers within a molecular weight range of about 400 to about 3,000, resulting from the reaction of a diisocyanate, such as tolylene diisocyanate, ditolylene diisocyanate, or dianisidine diisocyanate, with a hydroxyl-terminated polyether (such as polyethylene ether and polypropylene ether) having a hydroxyl functionality of two or higher. Also useful are prepolymers (within a molecular weight range of about 400 to about 3,000) based on a diisocyanate reacted with another hydroxyl-terminated compound, for example, a hydroxyl-terminated polyester or a hydroxyl-terminated aliphatic compound, having a functionality of two or higher. Useful polyesters may be based on a dicarboxylic acid, for example, adipic acid or azelaic acid, reacted with a lower alkyl glycol, such as diethylene glycol or propylene glycol, to give a polyester having a functionality of two. Useful polyesters may also be based on a dicarboxylic acid reacted with a mixture of a lower alkyl glycol and a minor amount of a hydroxyl-containing material with a functionality in excess of two, such as trimethylol propane, to give a polyester having a functionality somewhat greater than two.

Suitable cross-linking agents may be selected by using the following test. A 50 percent (by weight) solution of the proposed cross-linking agent in a suitable solvent, such as acetone, is prepared and the solution is sprayed onto a commercial medium-weight cotton shirting fabric (identical or equivalent to Style No. 5–4.15 cotton fabric made by Spartan Mills of 56×52 construction to a pickup level of about 20 percent, and then followed by pressing a layer of the foam described in example 1 with the sprayed cotton fabric at 160° C. for 30 minutes at 20 p.s.i. The cross-linking agent is satisfactory if immersion in acetone for 1 minute at about 20° C. causes no apparent delamination or change in thickness of the laminate, if the peel strength of the bonded laminate is at least 5 pounds per linear inch of width and if the laminate has a water vapor transmissivity of at least 5 grams of water each 24 hours for each 100 square inches of the sheet, as measured according to ASTM method E–96–56T, procedure B. The peel strength of the laminate is determined according to ASTM D751–64T in which the load required to delaminate a 1-inch wide strip of material is applied at a rate of 2 inches per minute.

In the practice of an embodiment of this invention, an open cell polyurethane foam is formed by the one-shot process by reacting a 2,000 molecular weight polyester glycol, for example, poly(neopentyl adipate) glycol, with a diisocyanate (such as tolylene diisocyanate, containing 80 percent of the 2,4 isomer and 20 percent of the 2,6 isomer) and water in the presence of a catalyst, suitable surface-active agents and other additives. Such an open-celled foam structure is shown schematically in FIG. 1, where "10" represents the thickened cell edges; "11," a membranous cell wall; and "12," a ruptured cell wall.

The open-cell foam is cut to the desired thickness, then hydrolytically reticulated as described, for example, in U.S. Pat. No. 3,171,820, explosively as described in U.S. Pat. No. 3,175,025, or reticulated in any other manner to produce a three-dimensional network structure of interconnecting polyurethane strands, Such a reticulated structure is shown schematically in FIG. 2 where "10" again represents the remaining strandlike cell edge and "20," interstices, wherein the structure schematically substantially free of cell wall material. That reticulated foam structure, as shown in FIG. 2, is "omnidirectional" in that it has a three-dimensional skeletal structure with substantially the same characteristics in any direction and is not directionally oriented. The reticulated foam may have a bulk density as low as approximately 1 pound per cubic foot or as high as about 15 pounds per cubic foot, and preferable between 2 and 10 pounds per cubic foot. This structure is then consolidated, after incorporation of a cross-linking agent, such as a polyisocyanate of the nature described above, by the application of heat and pressure to result in a sheet structure having a bulk density in excess of 30 pounds per cubic foot, and less than about 60 pounds per cubic foot. Since this structure is consolidated at a temperature considerably below its melting point, a large number of microscopic pores and air passages remain in the resulting sheet material. As the structure is compressed, the individual strands within the network structure coated with the polyisocyanate are brought into intimate contact with like neighboring strands. I believe that the temperature during compression causes chemical reaction of isocyanate groups with active hydrogens in the polyurethane and that this forms point chemical bonds at the points of contact. FIG. 3 illustrates such a consolidated structure. In the detailed portion FIG. 3, an individual strand is represented as "10," a void within the structure is "20," and a bond between two adjacent strands as "21." This product is useful alone, for example, as a diaphragm or bonded to a woven fabric (by applying the polyisocyanate between the foam and fabric and similarly compressing with heat and pressure) for use as a raincoat material or the like. One of the most important uses is as a leather replacement material when bonded to a fibrous substrate. A leather substitute material is shown schematically in FIG. 4 where the compacted structure is represented as "30" and the substrate as "31."

Where the reticulated foam is to be bonded to a substrate the polyisocyanate is applied between the foam and the substrate and the composite is compressed with pressure and heat in the same manner used to compress the foam alone. The foam may be compressed before consolidation with the substrate or all compression of the foam may occur when it is consolidated with the substrate.

Similarly, although not specifically shown in the drawings, where the foam is bonded to a substrate for use as a leather replacement material, polyurethane strands coated with the polyisocyanate (or other cross-linking agent) and adjacent to the substrate material are bonded to the surface of the substrate next to the reticulated foam. Where, for example, fibers in the substrate contain active hydrogen atoms and the cross-linking agent is a polyisocyanate the bonds are believed to be chemical in nature. Such fibers may include natural fibers, such as wool, cotton and silk, and manmade fibers, such as rayons, nylons, and cellulose acetates.

Substrates formed solely from inert fibers such as unmodified polypropylene, polyacrylonitrile and polyethylene terephthalate are not useful in this invention. However, such a fiber may be modified (by chemical treatment, for example, to provide dye-receptive sites, or by the addition of another compound) to render it useful to form a fabric which may be used to make a composite material according to this invention. A substrate, for example, a nonwoven fabric, made from such an inert, unmodified fiber may also be rendered useful by the addition to it of a compound, such as a polyurethane binder or an acrylic-type binder, which will function in the bonding of the substrate to the compressed skeletal foam.

In using my invention to form a composite material including a substrate, there may be used either a conventional woven fabric or one of the well-known nonwoven fabrics produced by methods common in the art, including carding, garnetting, air-laying and others, and variously appearing in the form of webs, batts, felts and mats. The nonwoven substrates can be further processed if desired by needle-punching on a loom which can pierce a batt up to 20,000 times per square inch with needles from 1 to 10 mils in diameter. The fibers in such needle-punched nonwoven materials are somewhat more oriented and interlocked in the vertical plane through which the needle punches and thus leads to stronger, more coherent structures than is usually possible with the initial unneeded nonwoven fabric. Furthermore, the nonwoven fabrics may be made in a variety of thicknesses varying from about 10 to about 500 mils, preferably 35 to 100 mils, and densities varying from about 1 to about 15 ounces per square yard, preferably about 2 to 8 ounces.

A nonwoven fibrous material used in the practice of this invention to form a composite material may comprise one or more natural or manmade fibers containing active hydrogen atoms or other reactive sites. It may also be a blend of relatively inert fibers such as unmodified polypropylene, unmodified polyacylonitrile, or unmodified polyester, randomly distributed with varying amounts of the above-mentioned reactive fibers, the amounts depending on the properties required, or it may also comprise inert fibers which have been modified with reactive sites, such as dye-receptive sites, or which have been impregnated with a reactive binder, such as a polyurethane. Fiber deniers from about 1 to 25 and higher may be used, but for products with more leatherlike properties the fine denier fibers in the range of about 1 to about 3 denier are preferred.

To improve strength and dimensional stability and to approach the esthetics of leather, the nonwoven fabric is generally impregnated with about 50 percent to 225 percent, preferably 150 percent to 200 percent, of a binder material, such as a polyurethane or an acrylic latex. Impregnation with less than about 50 percent leads to a weak nonuniform substrate, whereas substantially more than 225 percent leads to a rubbery or plastic appearance and tactile feel and greatly reduces the permeability of the nonwoven substrate.

The vapor permeability of a composite material according to this invention is determined by the characteristics of the substrate and by the bulk density and average cell size of the skeletal foam (including the equivalent material described in U.S. Pat. No. 3,178,300 and hereinafter referred to) and the temperature and pressure applied to effect compaction. Thus, for example, a reticulated foam having a bulk density of 1 pound per cubic foot and 100 cells per linear inch with a thickness of 0.25 inch produces a highly porous structure if compressed to a bulk density of 50 pounds per cubic foot by compressing the structure at 120° C. at a pressure of 60 p.s.i. for 30 minutes. Vapor permeability is decreased if the original structure has a higher bulk density and smaller average pore size. Further, a substantially impermeable sheet may result, if temperature and pressure conditions are so high as to result in a final bulk density of the compressed foam in excess of about 60 pounds per cubic foot.

Where the product of this invention is used as a leather replacement material, the skeletal polyurethane foam should be consolidated under conditions sufficient to give a continuous network of point bonded fibrous polyurethane strands having a water vapor transmissivity of at least 5 grams of water each 24 hours for each 100 square inches of the sheet, as measured according to ASTM method E–96–56T, procedure B.

In carrying out my invention an open-cell polyurethane foam may be compacted, then reticulated and bonded by use of a cross-linking agent. This is not preferred as it renders difficult the removal of the cell walls without disintegration of the strands and also because it renders difficult penetration of the cross-linking agent to the places of contact where the point bonds are to be formed.

The various processes for the production of open-celled polyurethane foams useful in carrying out the invention are quite well known in the polymer art. As stated, most commonly such foams are prepared by reacting a 500 to 5,000 molecular weight polyol and water with an excess of a polyisocyanate in the presence of suitable catalysts, surface-active agents and other additives, such as an antioxidant. In producing flexible open-celled foams for use in my method, the polyol preferably and conventionally has a hydroxyl functionality between two and three and is based on either a polyether, polyester or a mixture thereof. The polyisocyanate most commonly used in flexible foams has a functionality of two and those frequently used are tolylene-2,4-diisocyanate, tolylene-2,6-diisocyanate, or mixtures thereof. Water reacts with isocyanate groups to produce carbon dioxide as a byproduct. This generation of carbon dioxide results in the formation of bubbles which expand in the still fluid material to form the foamed structure. Foaming also may be assisted by the addition of various blowing or frothing agents to the reaction mixture. Chain extenders other than water may be used. These include aliphatic diamines, such as ethylene diamine. In such a case, a foaming agent is required. Foam density, cell dimensions, and the degree of openness are controlled by the selection of catalyst, surface-active agents and type and amount of foaming agents.

All of such conventional foams may be used in accordance with this invention.

Where my invention is used to make a material useful as a leather replacement it is important that the composition of the polymer used in producing the foam having hydrolytic stability, stability to oxidation and high heat resistance. This may be achieved by having in the polymer a minumum number of sites susceptible to oxidation or hydrolysis or by having in the polymer groups which inhibit hydrolysis or oxidation. The foam described in example 1 is particularly useful to form such a material. Where a polyether is used to form the foam to produce such a material, in order to give good hydrolytic stability the polyether should be based on an aliphatic chain segment having at least 3, preferably 4 or more carbon atoms. For this purpose, polyethers based on ethylene oxide are not useful because they are hygroscopic. Where a hydroxyl-terminated polyester is used to form a foam to make such a leather replacement material, to give good hydrolytic stability the segments between carbonyl groups should contain at least 4 carbon atoms. Where the foam is made from a hydroxyl-terminated polyester based on a single dicarboxylic acid and a single glycol, it is preferred that the segments between carbonyl groups contain no more than about 5 carbon atoms since one with longer segments tend to form a crystalline, and thus a more rigid, polymer. However, if a copolymer (whether a polyether or a polyester) is used, longer segments up to 10 carbon atoms are useful. Where the foam is made from a hydroxyl-terminated polyester based on a single dicarboxylic acid and a single glycol and the glycol contains a carbon segment with side groups, such as neopentyl glycol or 2,2,4-trimethyl-1,3-pentanediol, an aliphatic chain segment of up to about eight carbon atoms may be used. A copolyester glycol made by reacting a mixture of 1,6-hexanediol (8 to 5 moles) and neopentyl glycol (2 to 5 moles) with adipic acid is particularly suitable to produce a foam to make a leather replacement material according to my invention.

Where my invention is used to form a material useful as a leather replacement, the polyurethane used to form the skeletal foam should not show appreciable crystallinity when tested by conventional X-ray diffraction methods at room temperature.

For reticulation of the open-celled foam according to my invention, there are a number of prior art processes which may be used. Hydrolytic reticulation, that is, removal of the thin membranous cell walls by selective hydrolysis, is described, for example, in German Pat. No. 905,033, Belgian Pat. No. 543,362 and U.S. Pat. No. 3,171,820. An explosive method of reticulating cellular material is described in U.S. Pat. No. 3,175,025. For the specific purposes of this invention the preferred method is reticulation by exposing the foam structure to a flow of hot air or other substantially inert gas which serves substantially to melt or degrade the cell wall material.

By careful selection of processing conditions, reactive components, catalysts and various additives, it is possible to produce a foam which has a structure similar to that obtained when an open cell foam is reticulated by one of the prior art processes. Such structure, as described more fully in U.S. Pat. No. 3,178,300, may be converted into vapor permeable films by the process of this invention. REference herein and in the claims to a "skeletal polyurethane foam" includes such structures, open cell polyurethane foams which have been reticulated, and others equivalent to a foam produced by conventional reticulation of an open cell polyurethane foam. All that is necessary is that the foam to be used in my method be like a foam that has been reticulated whether than product is obtained by reticulation or by another procedure giving a comparable product.

The skeletal polyurethane foam may be consolidated and compacted in the presence of the cross-linking agent to form the sheet structure using conventional equipment for applying pressure at a controlled temperature. The process may be carried out as a batch operation using conventional plate presses equipped with controlled temperature platens. AS a continuous process, the foam may be consolidated with the aid of calender presses such as these common to the plastic and paper industries.

Where the foam is consoldiated with a substrate material, the cross-linking agent may be placed on one side of the substrate by any conventional technique, such as by spraying or coating with a doctor blade, or impregnated throughout the substrate by immersion techniques. Alternatively, the foam may be coated or sprayed with, or immersed in, the agent (and, if necessary, any excess removed) after which the laminate is consolidated with heat and pressure. For better control, I prefer the former manner of carrying out the invention, since adding the agent to the foam may lead to excessive deposition of it within the foam and thus cut down water vapor transmissivity. Ordinarily, a pressure of about 15 to 50 p.s.i., a temperature of about 160° C. and a dwell time of 20 to 30 minutes are adequate. Of course, these can be varied depending on the particular foam and cross-linking agent used. A catalyst, including conventional urethane catalysts, may be used to reduce the temperature or time required for consolidation. A further aid in consolidation of the foam structure and to improve its surface physical and esthetic properties of the final compacted product so that it is more leatherlike and also more abrasion resistant, polymeric materials such as polyethylene or polyvinyl chloride may be incorporated into the foam structure by dispersing at high shear 15–55 parts, preferably 20–25 parts, of polyethylene or polyvinyl chloride per 100 parts of the glycol or mixture of glycols used in producing the foam, prior to the foaming reaction.

Plasticizers or softening agents may be applied to the foam structure prior to compaction (whether or not the foam is consolidated with a substrate). Such compounds may be applied in pure form or, more conveniently, as aqueous solutions or emulsions. Examples of such compounds which are particularly useful are dioctylphthalate, lanolin, castor oil and linseed oil. Compounds of this nature have the effect of reducing the time, temperature and pressure required to provide good compaction. They also result in a smoother, more light reflective, skin effect on the compacted material.

The following examples illustrate my invention.

EXAMPLE 1

A mixed polyester-polyether foam for use in the following examples was prepared in a one-shot process by first blending 102.8 parts of poly(neopentyl adipate) glycol having an hydroxyl number of 58.5, 1.8 parts of carbon black, 4.2 parts of poly(propylene ether) glycol having a hydroxyl number of 112.9, 0.55 parts of trimethylolpropane, and 0.63 parts of a polypropylene oxide adduct of glycerine having a hydroxyl number of 56.9. The resulting blend was then mixed with 47.0 parts of a mixture of 80 percent 2,4 and 20 percent 2,6 tolylene diisocyanate, 1.0 parts of dioctyl phthalate, 2.0 parts of N-ethyl morpholine, 0.2 parts of GE-1034 silicone, 1,3 parts of Witco Fomrez 77-86, 1.0 parts of Witco Fomrez 10-58, 0.45 parts of a tertiary amine, Armour DM16D, and 0.17 parts of stannous octoate on a commercial foam-making machine. The mixture of reaction components from the machine was collected in a paper-lined mold where it began to foam in about 10 seconds and rose to its maximum height in about 100 seconds. It was then cured in an oven at about 170° F. for about 2 hours, and finally sliced into sections one-quarter inch in thickness. The resulting polyurethane foam layers had about 65–70 cells per linear inch, a density of about 1.8 pounds per cubic foot, and was extremely resistant to alkaline hydrolysis, exposure to 10 percent aqueous sodium hydroxide for 24 hours resulting in little visible removal of the membranous cell walls.

To improve porosity of the products in the following examples, the cell membranes in the foam were removed (reticulation) by alkaline hydrolysis in 15 percent aqueous sodium hydroxide for about 60 hours at 240° C., followed by thorough rinsing and air-drying.

EXAMPLE 2

A layer (one-fourth inch thick) of the reticulated foam of example 1 was pressed with a layer of a commercially available nonwoven material (comprised of a needled batt of staple fibers, 50 percent polyester, 30 percent nylon and 20 percent rayon (designated as S-3175 and sold by Toyobo Seiki of Japan) and containing about 200 percent its weight of a binder such that the weight of the impregnated material was 400 g./m.$^2$) in a press with a heated upper platen at 170° C. and a cooled lower platen at 40° C. for 30 minutes at 20 p.s.i. The resulting compacted laminate was resilient, had a moderately glossy leatherlike foam topcoat surface and a soft fleshlike substrate surface. However, the foam topcoat was very readily peeled from the substrate with a force of less than 1 pound per linear inch. Furthermore, immersion of the laminate in acetone immediately swelled the foam layer to such an extent that it not only floated free from the substrate but partially expanded to the original open foam dimensions. Prolonged immersion in acetone (1 minute) led to almost complete disintegration of portions of the newly expanded foam. In addition, exposure of another portion of the stretched laminate to hot air at 285° F., simulating the effects of heat-setting in the shoe factory, resulted in almost complete delamination and extensive tearing of the top-coat after only 10 seconds exposure. Moisture vapor transmission (MVT) determined according to ASTM No. E96-63T procedure B was 97 percent of calf leather.

EXAMPLE 3

A 16.1 gram portion of the commercial substrate used in example 2 was impregnated with 27.9 grams of a 600 molecular weight, 36 carbon fatty acid diisocyanate produced by General Mills Co. and designated DDI-1410, then pressed with a 7.5 gram layer of reticulated foam at 160° C. and 40° C., upper foam and lower substrate platens, respectively, for 35 minutes at 20 p.s.i. The resulting laminate was slightly tacky because of excess unreacted diisocyanate and was therefore extracted with acetone for 30 seconds, air dried for 1 hour, then repressed 10 minutes at 170° C. and 40° C. and 10 p.s.i. The final laminate had a DDI uptake of 35 percent based on the laminate weight and had the suppleness and tactile hand of calf leather. The laminate remained unswollen after immersion in acetone for 2 minutes and was unaffected by a 60 second exposure to hot air at 285° F. Adhesive strength of the foam-substrate bond as measured by the force required to peel the two layers apart was greater than 8 pounds/linear inch. MVT was 60 percent that of calf leather.

EXAMPLE 4

A layer of 4 oz./yd.$^2$, 3 denier per filament unmodified polypropylene felt (designated as No. 62PO(3)3/50 and sold by American Felt Co.) was impregnated as in example 2 with DDI-1410 (DDI is a trademark of General Mills Co.) and then pressed with a layer of reticulated foam for 36 minutes at 20 p.s.i. and 170° C. and 40° C. upper and lower platens, respectively.

No bonding of foam to polypropylene felt occurred, indicating that the mechanism of bonding strength is dependent on reacting and tying together active hydrogens in both the substrate and foam.

EXAMPLE 5

A portion of 65 percent polyester and 35 percent cotton fabric of 85 ends × 73 picks was impregnated with DDI-1410 as in example 3 then pressed with a ¼-inch thick layer of the reticulated foam of example 1 at 30 p.s.i. for 46 minutes at 160° C. on both upper and lower platens. The resulting laminate was so firmly bound that the topcoat foam layer tore before it could be separated from the fabric layer.

EXAMPLE 6

A layer of the substrate used in example 3 was impregnated with 120 percent by weight of tolylene diisocyanate (80 percent 2,4 and 20 percent 2,6) and pressed with a ¼-inch thick layer of the reticulated foam of example 1 at 20 p.s.i. for 40 minutes at 170° C. and 40° C., upper and lower platens, respectively. The resulting laminate was boardy, readily developed cracks in the topcoat foam layer when folded, and delaminated very readily with a peeling force of only a few ounces.

EXAMPLE 7

The same procedure was followed as in example 6 but hexamethylene diisocyanate replaced the tolylene diisocyanate. Laminate properties were similar to those of example 6.

EXAMPLE 8

A 15.5 gram portion of commercially available nonwoven material (comprised of 60 percent polyester and 40 percent nylon and containing about 200 percent by weight of a binded such that the weight of the impregnated material was 562 grams per square meter (designated as ZK–151 and sold by Toyobo Seiki of Japan) was further impregnated with 18.0 grams of DDI then pressed with a 7.4-gram layer of reticulated foam (from example 1) at 170° C. and 40° C. for 28 minutes at 20 p.s.i. The resulting laminate was immersed in acetone for 30 seconds, air dried for 1 hour then repressed 10 minutes at 170° C. and 40° C. and 10 p.s.i. The resulting laminate had a DDI uptake of 36 percent based on a laminate weight and had a suppleness and tactile hand of calf leather. The laminate remained unswollen after immersion in acetone for 2 minutes and was unaffected by a 60 second exposure to hot air at 285° F. Adhesive strength of the foam substrate bond was greater than 7 pounds per linear inch. MVT was 55 percent that of calf leather.

EXAMPLE 9

A urethane prepolymer was prepared by reacting 300 grams of a 300 molecular weight polyethylene ether glycol with an equimolar amount of tolylene diisocyanate (same mixture of isomers as in example 6) at 100° to 105° C. for 75 minutes, then diluted with acetone to about 35 percent solids. A layer of the same substrate used in example 3 was sprayed on one surface with this prepolymer solution then pressed with a foam layer (from example 1) at 18 p.s.i. for 50 minutes, the upper and lower platens being at 170° C. and 45° C., respectively. The resulting laminate had a prepolymer uptake of 10 percent and the laminate properties were similar to those of the product of example 3.

EXAMPLE 10

A 10.7 gram portion of the substrate used in example 3 was sprayed with a solution of 9.5 grams DDI–1410 in 48.0 grams of acetone then pressed with a 2.0 gram layer of foam at 20 p.s.i. for 22 minutes. The upper and lower platens were at temperatures of 165° C. and 35° C., respectively. The resulting laminate had an uptake of 20 percent DDI and showed a laminate peeling strength of greater than 7 pounds per linear inch and a MVT value of 90 percent calf leather. Solvent and heat resistance of the laminate were similar to that of the product of example 3.

EXAMPLE 11

A nonwoven material (needled batt weighing 8.25 ounces per square yard) comprised of 100 percent polyester staple (designated as Lot 14402 and sold by Fibers Industries, Inc.) of 3.0 denier per filament and 1.5-inch staple length was pressed with a layer ¼-inch thick) of the reticulated foam of example 1 for 60 minutes at 10 p.s.i. and 164° C. and 45° C. on upper and lower platens, respectively. The resulting compacted laminate was very readily peeled apart, the foam surface separating from the polyester substrate with a force of less than 1 pound per linear inch.

EXAMPLE 12

A 4.5 gram portion of the same polyester batt used for example 11 was sprayed on one side with a 50 percent of DDI in acetone, then pressed with a 3.9 gram layer of foam at 10 p.s.i. for 60 minutes at 162° C. and 45° C. on upper and lower platens, respectively. The resulting laminate had an uptake of 33 percent DDI and could not be pulled apart without tearing the foam layer.

EXAMPLE 13

A ¼-inch thick commercial polyester foam from Reeves Bros. Inc. designated as No. 508–D with a density of about 1.7 pounds per cubic foot was treated with 15 percent aqueous sodium hydroxide for 3 hours at 30° C. to remove the cell membranes, then rinsed thoroughly and dried. A 14.0 gram portion of the same substrate used in example 2 was sprayed with a 50 percent solution of DDI–1410 in acetone to a pickup level of 20 percent, then pressed with the above treated foam at 160° C. and 40° C., upper and lower platens, respectively for 30 minutes at 20 p.s.i. The resulting laminate had properties comparable to those in example 3.

EXAMPLE 14

A ¼-inch thick commercial polyether foam from Reeves Bros. Inc. designated as No. 609 with a density of 1.15 pound per cubic foot and based on a poly(oxypropylene) adduct of a glycerine class triol was treated with 15 percent aqueous sodium hydroxide for 62 hours at 30° C. to remove the cell membranes then rinsed thoroughly and dried. A 14.0 gram portion of the same substrate used in example 2 was sprayed with a 50 percent solution of DDI–1410 in acetone to a pick up level of 20 percent, then pressed with the above treated foam at 160° C. and 40° C., upper and lower platens, respectively, for 30 minutes at 20 p.s.i. The resulting laminate had properties comparable to those in example 3.

I CLAIM:

1. A compressed sheet structure, having a density of at least 30 pounds per cubic foot and less than about 60 pounds per cubic foot, comprising a network of polyurethane strands point bonded by a cross-linking agent satisfying the test specified herein and formed by impregnating a skeletal omnidirectional polyurethane foam network with said agent and compressing said foam with heating.

2. A compressed sheet structure, having a water vapor transmissivity of at least 5 g. $H_2O$ per 100 sq. in. per 24 hours, comprising a network of polyurethane strands point bonded by a polyisocyanate satisfying the test specified herein and formed by impregnating a reticulated omnidirectional polyurethane foam network with said polyisocyanate and compressing said foam network with heating.

3. A product useful as a leather replacement material, comprising a compressed sheet structure, having a water vapor transmissivity of at least 5 g. $H_2O$ per 100 sq. in. per 24 hours and having a network of polyurethane strands point bonded by a polyisocyanate satisfying the test specified herein and formed by impregnating a reticulated omnidirectional polyurethane foam network with said polyisocyanate and compressing said foam network with heating, said structure being bonded to a substrate material by said polyisocyanate.

4. The product of claim 3 wherein said substrate material is a nonwoven fabric formed from staple fibers and at least 5 percent of said fibers contain active hydrogen atoms.

5. The product of claim 4 wherein said active hydrogen containing fibers comprise at least one fiber selected from the class consisting of natural fibers, rayons, nylons and cellulose acetates and said polyisocyanate is a long chain aliphatic diisocyanate.

6. The product of claim 3 wherein said polyurethane strands are formed from a polyurethane which is stable to hydrolysis and oxidation and which at room temperature does not show appreciable crystallinity.

7. The product of claim 3 wherein said polyurethane strands are formed from a polyurethane containing carbon segments having no less than three carbon atoms and which at room temperature does not show appreciable crystallinity.

8. The product of claim 7 wherein said polyurethane is formed essentially by reacting a hydroxyl-terminated compound, a diisocyanate and a chain extender, the said hydroxyl-terminated compound comprising a major amount of poly(neopentyl adipate) glycol.

9. The product of claim 7 wherein said polyurethane is formed essentially by reacting a hydroxyl-terminated compound, a diisocyanate and a chain extender, the said hydroxyl-terminated compound comprising a major amount of a copolyester glycol formed by reacting adipic acid with a mixture of 50–80 mole percent 1,6-hexanediol and 50–20 mole percent neopentyl glycol.

* * * * *